(12) United States Patent
Das et al.

(10) Patent No.: US 11,084,472 B2
(45) Date of Patent: Aug. 10, 2021

(54) METHOD AND SYSTEM FOR JERK-FREE STOPPING A MOTOR VEHICLE

(71) Applicant: Ford Global Technologies, LLC, Dearborn, MI (US)

(72) Inventors: Ashrit Das, Canton, MI (US); John Broderick, Willis, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 387 days.

(21) Appl. No.: 15/652,205

(22) Filed: Jul. 17, 2017

(65) Prior Publication Data
US 2018/0015913 A1    Jan. 18, 2018

(30) Foreign Application Priority Data

Jul. 18, 2016  (DE) .......................... 102016213031.5

(51) Int. Cl.
*B60T 8/18* (2006.01)
*B60T 7/12* (2006.01)
*B60T 8/00* (2006.01)
*B60T 7/22* (2006.01)
*B60T 8/172* (2006.01)

(52) U.S. Cl.
CPC .............. *B60T 8/1806* (2013.01); *B60T 7/12* (2013.01); *B60T 7/22* (2013.01); *B60T 8/00* (2013.01); *B60T 8/172* (2013.01); *B60T 2201/02* (2013.01); *B60T 2230/04* (2013.01)

(58) Field of Classification Search
USPC ...................................................... 701/70
See application file for complete search history.

(56) References Cited

U.S. PATENT DOCUMENTS

| 2,907,607 | A | * | 10/1959 | Williams | B60T 8/1705 303/182 |
| 3,519,805 | A | | 7/1970 | Throne-Booth | |
| 4,636,011 | A | * | 1/1987 | Blomberg | B60T 8/4009 303/115.4 |
| 4,718,734 | A | * | 1/1988 | Gaiser | B60T 8/282 303/24.1 |
| 4,760,529 | A | | 7/1988 | Taka et al. | |
| 7,013,867 | B2 | * | 3/2006 | Rammer | F01L 13/065 123/321 |
| 7,425,042 | B2 | | 9/2008 | Fujiwara et al. | |
| 7,475,953 | B2 | | 1/2009 | Osborn et al. | |
| 2003/0015155 | A1 | * | 1/2003 | Turner | F01L 9/02 123/90.12 |
| 2003/0230443 | A1 | * | 12/2003 | Cramer | B60G 3/20 180/65.51 |

(Continued)

FOREIGN PATENT DOCUMENTS

| EP | 2902278 A1 | 8/2015 |
| WO | WO2004098942 A1 | 11/2004 |

*Primary Examiner* — Tyler D Paige
(74) *Attorney, Agent, or Firm* — Raymond L. Coppiellie; Burgess Law Office, PLLC

(57) ABSTRACT

A method and system for jerk-free stopping of a motor vehicle to automatically bring the motor vehicle to a standstill at a predetermined destination point, wherein the deceleration exerted on the motor vehicle is ascertained, entirely or in part, as the difference of a spring force component and a damping component, with the damping component being proportional to the present vehicle velocity.

3 Claims, 5 Drawing Sheets

(56) References Cited

U.S. PATENT DOCUMENTS

| | | | |
|---|---|---|---|
| 2007/0027604 A1 | 2/2007 | Cuevas et al. | |
| 2013/0072347 A1* | 3/2013 | Birkhold | B60K 6/387 |
| | | | 477/5 |
| 2014/0265542 A1* | 9/2014 | Boswell | B60T 13/142 |
| | | | 303/3 |
| 2014/0265545 A1* | 9/2014 | Yang | B60T 13/588 |
| | | | 303/14 |
| 2015/0073670 A1* | 3/2015 | Matsuno | B60K 17/35 |
| | | | 701/53 |
| 2015/0203087 A1* | 7/2015 | Ozsoylu | B60T 13/145 |
| | | | 188/359 |
| 2015/0283992 A1* | 10/2015 | Kawai | B60K 6/383 |
| | | | 475/2 |
| 2018/0015913 A1* | 1/2018 | Das | B60T 7/12 |

\* cited by examiner

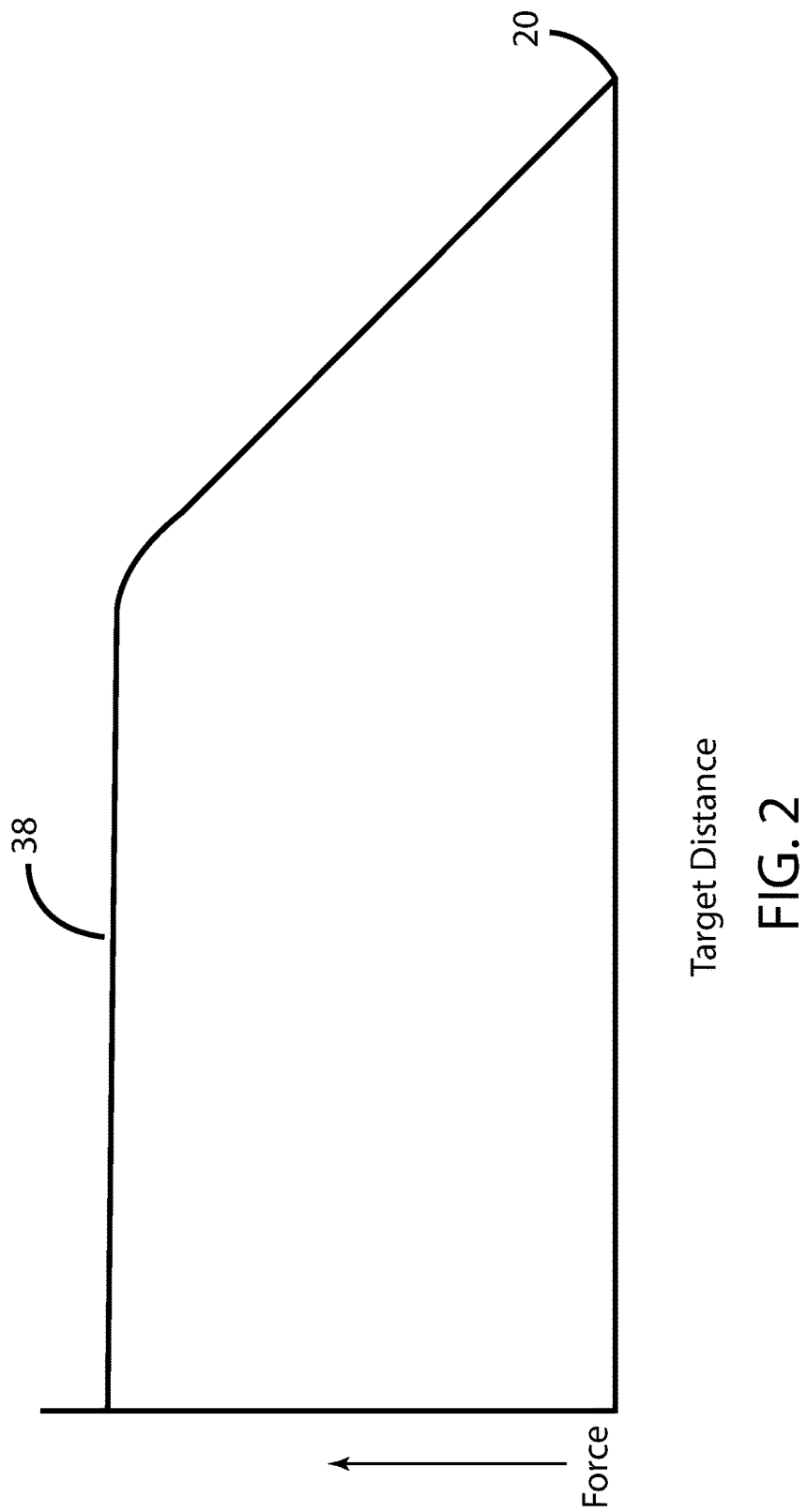

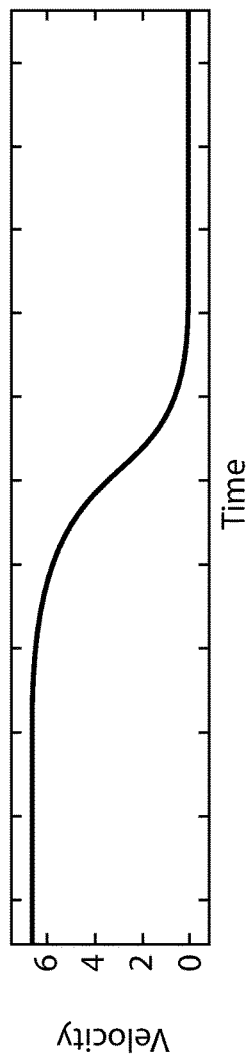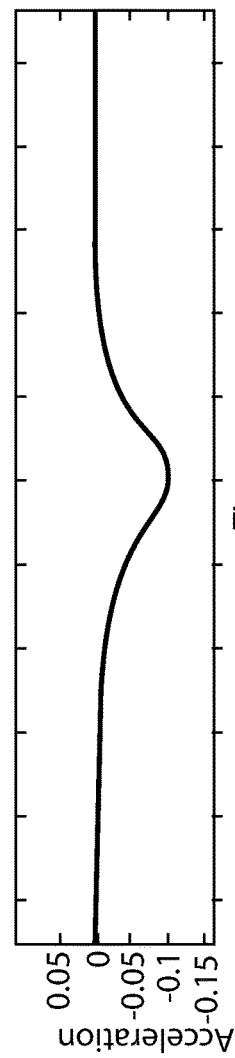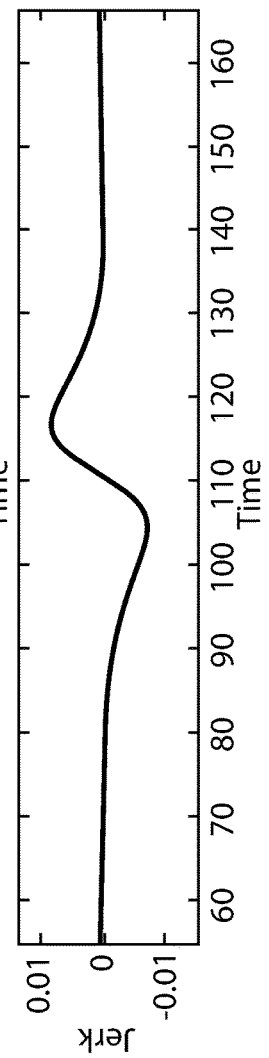
FIG. 4a
FIG. 4b
FIG. 4c
FIG. 4d

METHOD AND SYSTEM FOR JERK-FREE STOPPING A MOTOR VEHICLE

CROSS-REFERENCE TO RELATED APPLICATIONS

Not Applicable.

BACKGROUND OF THE INVENTION

1. Field of the Invention

The present invention relates generally to a method and system for jerk-free stopping of a motor vehicle; and more specifically to determining a force or torque as a function of a distance to a destination point.

2. Description of Related Art

Carrying out a jerk-free stop in an electrically or hybrid-electrically driven motor vehicle, is a challenge when distance control is also required. For example, when the vehicle, proceeding from a given velocity, is supposed to gently come to a standstill as precisely as possible at a predetermined destination point. Such situations are the rule in the case of autonomously traveling vehicles, although they can also occur in non-autonomously traveling vehicles when said vehicles include driver assistance systems, systems that assist automatic stopping at a red light or a stop sign.

Up to now, a more or less unsatisfactory compromise existed between the accuracy of the vehicle coming to a standstill at the destination point and the absence of a jerking motion at the stop.

SUMMARY OF THE INVENTION

A method for the jerk-free stopping of a motor vehicle to automatically bring the motor vehicle to a standstill at a predetermined destination point by ascertaining the deceleration exerted on the motor vehicle based on the difference between a spring force component and a damping component, wherein said damping component is proportional to vehicle velocity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1a is a schematic of a velocity profile according to an exemplary embodiment of the present invention.

FIG. 1b is a schematic of an acceleration profile 30 corresponding to the velocity profile 10 illustrated in FIG. 1a.

FIG. 2 is a schematic illustrating the relationship between a spring force like component and distance.

FIGS. 4a-4d are diagrams of distance, velocity, acceleration, and jerk during the stopping/braking procedure resulting from the torque values in FIGS. 3a and 3b.

DETAILED DESCRIPTION OF THE PREFERRED EMBODIMENTS

The following description of the preferred embodiment(s) is merely exemplary in nature and is in no way intended to limit the invention, its application, or uses.

In one exemplary embodiment, the vehicle carries out a stopping/braking procedure similar to and reproducing the dynamics of a damped door closer that gently closes the door at the same position.

With a damped door closer, the energy required for closing the door is stored in a spring during the opening of the door and is released again, in a hydraulically damped manner, during the subsequent closing motion. In general, the closing speed can be set in a step-free manner. The objective is to achieve the aperiodic limit case because the door is then closed in the shortest time and without overshoots.

Two torques are involved in the closing of the door, namely the torque due to the spring or spring-like force f, which depends on the deflection x of the door, and the damping torque g, which is a function of the closing speed v. The difference between the two is proportional to the product of the moment of inertia and the angular acceleration of the door.

Turning to the exemplary embodiment for jerk-free stopping/braking of a motor vehicle set forth herein, the moment of inertia and angular acceleration are replaced by the mass m and the acceleration a of the vehicle, wherein the acceleration is negative. Since the stopping/braking force corresponds to the spring force f of the door closer the equation analogous to the movement of a door having a damped door closer is:

$$m \cdot a = f(x) - g(v)$$

In addition to the terms "spring force/braking force" and "vehicle acceleration," the terms "torque" and, optionally, angular acceleration are also used because the braking force is exerted on the brakes as a negative torque. Further, the term stopping or braking force or stopping/braking force refer to braking torques exerted to stop the vehicle and may occur independently or collectively between the internal combustion engine, the electric machine, and the friction brakes of a hybrid vehicle.

Figures 1A, 1B:
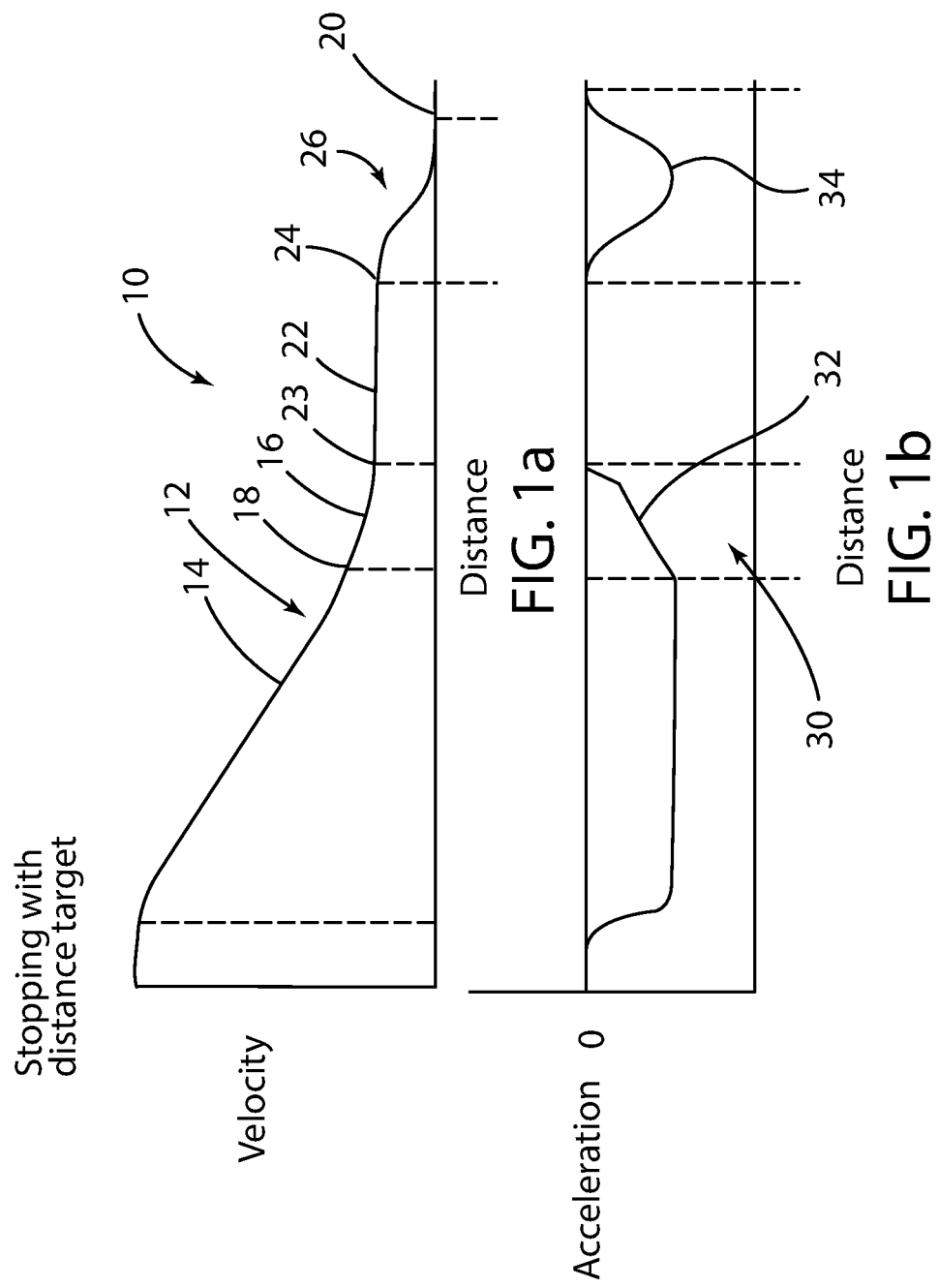

FIG. 1a is a schematic of a velocity profile, seen generally at 10, for stopping the vehicle within or at a target distance stopping point 20 having two braking phases 12, 26. The first braking phase 12 including a brake application component wherein application of the brake takes most of the kinetic energy out of the system. As illustrated the slope or curve of the brake application phase 12 includes two portions, a first portion 14 having a relatively constant linear slope extending to transition point 18 and a second portion 16 having a nonlinear or curved slope extending between a transition point 18 and a transition point 23. The velocity profile 10 further includes a brake released phase 22 wherein the vehicle velocity remains relatively constant as the brakes are released. At the transition point 24 between the first braking phase 14 and the second braking phase 26 the vehicle reaches a predetermined speed, for example 10 kph, while having a predetermined distance, for example 15 m, to stop. Upon reaching the transition point 24, the second braking phase 26 removes the remaining energy from the system and brings the vehicle to a stop within the target distance at the selected or predetermined stopping point 20, the point in time when the vehicle velocity is zero.

As set forth herein, the exemplary method includes two parts, the first part being the second braking phase 26 and the second part being the second portion 16 of the brake application phase 12.

FIG. 1*b* illustrates an acceleration profile 30 corresponding to the velocity profile 10 illustrated in FIG. 1*a*. The acceleration profile 30 illustrating the respective acceleration/deceleration associated with the respective portions of the velocity profile 10, wherein FIG. 1*b* illustrates an acceleration/deceleration 32 corresponding to the second portion 16 of the brake application phase 12 and an acceleration/deceleration 34 corresponding to the second braking phase 26.

FIG. 2 illustrates the relationship between a spring or spring-like force component and distance. The profile shape 38 shown resulting from subtracting an inverse exponent from a constant and mirroring it around the y-axis. FIG. 2 illustrates how the force component reduces from a constant value as the vehicle approaches its final destination or target distance stopping point 20.

Figure 3A:
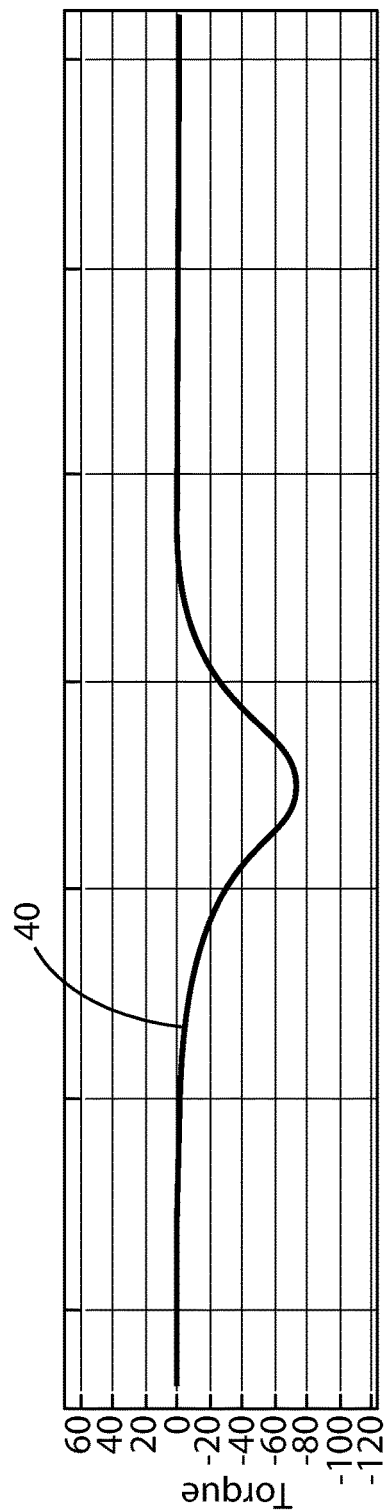
FIGS. 3a and 3b schematically illustrate the stopping/braking torque used in one exemplary embodiment.
Figure 3B:
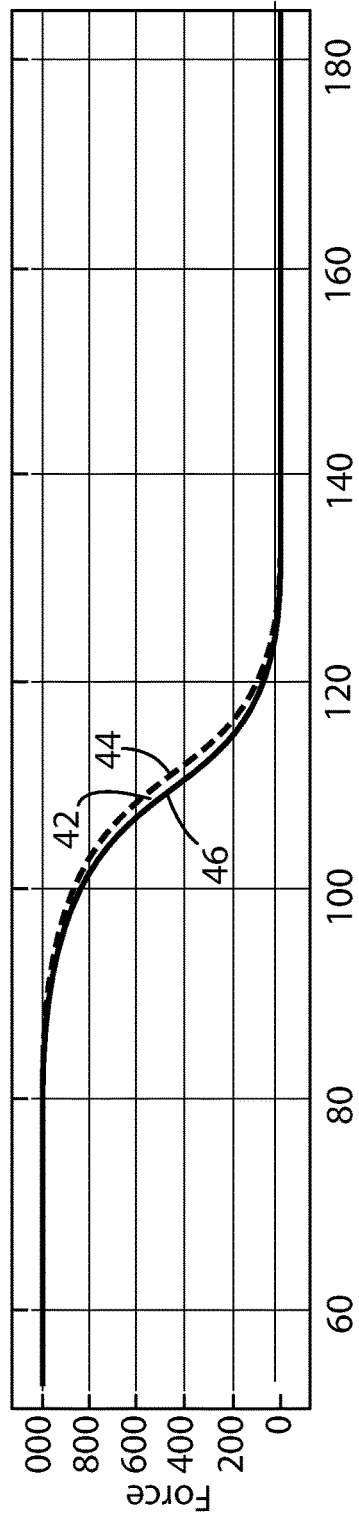

FIGS. 3*a* and 3*b* show the braking torque 40 used in one exemplary embodiment. The braking torque 40 of FIG. 3*a* seen in FIG. 3*b* as the difference, the gap 42, between the damping component, shown as the dashed line 44 and the spring force component, shown as the solid line 46.

As illustrated in FIG. 2, the spring force/braking force 38 or torque is a function of the distance to the destination point. Further, the damping force is a function of the vehicle velocity.

For the sake of simplicity, the damping force is proportional with the velocity. The spring force or force component drops to zero when the distance to the destination drops to zero. In addition, the spring force is limited at a maximum value. Therefore, the spring force or force component remains constant at its maximum value, while the distance to the destination point decreases and, from a certain distance onward, the spring force begins to decrease for the remaining distance to the destination.

In the exemplary embodiment, a profile for force and damping may be formulated as follows:

$$trq=trq\_gain \cdot (max(min(dtt \cdot scale\_down,1),0)) - v \cdot damping\_coeff$$

in which
trq=net torque
trq_gain=maximum torque
dtt=distance to the destination
scale down=scaling
v=instantaneous velocity
damping_coeff=damping coefficient Using such an approach, there would be a jerk in the vehicle at the beginning of the linear decrease in the spring force. Therefore, in a subsequent approach, the vehicle behavior is smoothed in these ranges by using a curve having a gentle shape.

A hyperbolic tangent or a hyperbolic tangent curve, which gently brings the maximum spring force to zero when the distance to the distance decreases, is suitable therefore. The following formula is utilized, wherein the offset is a suitably selected constant:

$$trq=trq\_gain \cdot 0.5 \cdot (tan\, h(dtt \cdot scale\_down+offset)+1) - v \cdot damping\_coeff$$

Consequently, it takes a long time for the spring force to reach zero and the vehicle creeps for a long time before coming to a standstill. Therefore, the spring force needs to be brought down from its maximum value more constantly than a linear approach, but brought to zero just as quickly.

For this purpose, the method uses an exponential curve as follows:

$$trq=trq\_gain \cdot (1-exp(-max((dtt-offset) \cdot scale\_down, 0))) - v \cdot damping\_coeff$$

In all the above-described methods, the damping is proportional to the velocity. The maximum steady state velocity can therefore be determined by dividing the maximum torque by the damping coefficient.

In the above-described method, scaling is utilized. The scaling depending on the maximum torque trq_gain and a constant scale setting scale_setting, as follows:

$$scale\_down=scale\_setting/trq\_gain$$

A given damping coefficient which, along with the spring force, is chosen for a nominal vehicle mass in such a way that the system response is overdamped and the vehicle mass variation, within reasonable limits, does not adversely affect the distance accuracy at stop.

A higher maximum torque trq_gain means that the braking maneuver is carried out more quickly. Meaning, when the spring force begins to decrease, a higher initial velocity results in the braking force curve being passed through more quickly. Therefore, the scaling is made inversely proportional to the maximum deceleration, as shown above. As a result, stops are carried out from different velocities using appropriate deceleration values in each case. Because the brake torque develops based on the gap 42 between the damping component, dashed line 44, and the force component, solid line 46, of FIG. 3*b*, choosing a higher damping makes the curves come closer providing a torque curve profile, as shown in FIG. 3*a*, having a lesser depth and more spread resulting in a final stopping maneuver having less jerk and less deceleration, but taking longer to execute. The method can be tuned by choosing appropriate values of the spring force curve profile and the damping curve profile resulting in good stopping behavior for all allowable disturbances in velocity and mass. In addition, the method may include an input from a gradient estimator and torque feed to cope with and compensate for road gradient.

The method is suitable for an initial deceleration of zero as it is initiated and requires a different maximum torque trq_gain for different initial velocity conditions. The resultant different scaling makes it possible to control the deceleration value. The scaling is essentially the slope of the force curve. For a high initial velocity, the distance to the destination rapidly decreases and, therefore, the force value rapidly decreases. In order to avoid a strong deceleration with a high velocity, the scaling must be low, and vice versa. All of this makes the method robust with respect to a varying initial velocity, without an initial deceleration or reasonable low initial deceleration like in coasting. Also, the bell shape of the deceleration curve is typical. This gives good robustness in terms of comfort and stopping accuracy for varying vehicle mass etc. however this method isn't suitable for very high initial velocities or initial deceleration too far off from zero. Because this would need to choose the spring force like component and damping component in a specific way to avoid torque jumps while initiating the maneuver.

Figure 5:
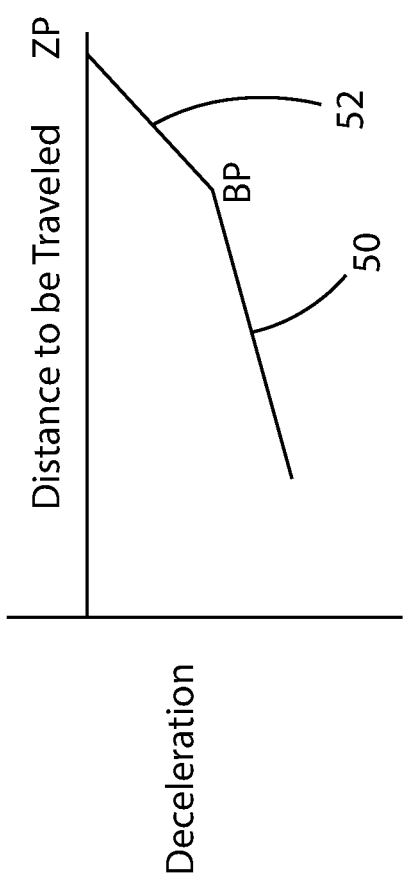
FIG. 5 schematically illustrates two ramp out sections of a first stopping/braking phase.

In one embodiment, the braking maneuver may begin with an initial deceleration, for example a constant deceleration using a control strategy having a long-range stopping distance approach, before using a short-range control strategy, for example as set forth above, to improve the accuracy that the vehicle comes to a standstill at the predetermined point in time. For such curves, using a piecewise linear deceleration, as shown in FIG. 5, including two straight components, helps to improve stopping accuracy. FIG. 5 illustrates one example of the deceleration curve 32 of FIG. 1a having a first component 50 extending at an initial slope up to a point BP, and a second component 52 extending from said first component at a greater final slope and terminating at the destination point ZP.

Based thereon, an additional function g(v,x)=refVel(x)−v is introduced, which is generated by integrating the deceleration curve shown in FIG. 5 over time, specifically beginning from a desired low velocity, for example 10 kph, at the point ZP, to generate a distance-based reference velocity. The velocity error refVel(x)−v is multiplied by a gain vel_gain. Using a scaling decel_to_trq_scaling for the ratio of deceleration to torque, this yields the following equation for the final torque demand:

$$trq = decel\_profile \cdot decel\_to\_trq\_scaling + vel\_gain \cdot (refVel(x) - v)$$

This torque demand is transmitted to a torque interface.

With a vehicle having a power-split hybrid drive, in the case of which the power of the internal combustion engine and at least one electric machine is distributed, the electric machine makes it possible to hold the creeping torque to zero. The torque calculated according to the above function, is fed to the torque interface which precisely distributes the predetermined acceleration and braking torques between the internal combustion engine, the electric machine, and the friction brakes of a hybrid vehicle.

In a purely electric motor vehicle, in which the method can also be carried out, the acceleration and braking torques would be distributed only between the electric machine and the friction brakes. This ensures that the vehicle is brought close to a predetermined low speed, e.g. 10 kph, at a predetermined low distance, e.g. 15 m, from where part one of the method can take over and bring the vehicle to a final soft stop with good robustness. This result is shown in FIG. 4.

FIGS. 4a-4d shows four separate diagrams of the time dependencies of distance, velocity, acceleration, and jerk, the time derivative of acceleration, for a braking procedure over a distance of 200 m, for exemplary simulation to illustrate the method, to a destination point with the simulation parameters Trq_gain=1000, scale_setting=100 and damping_coeff=150.

The simulation was repeated using different parameters and verified by carrying out the method in a real vehicle using different velocities and destination-point distances. In this case, it was also confirmed that the destination distance can be met very precisely, with a maximum deviation of approximately 10 cm to 15 cm, when the vehicle has come to a standstill.

As shown in FIGS. 4a-4d the method is highly desirable and results in almost every driver, regardless of their capabilities, both consciously and unconsciously, perceiving the braking procedure to be very comfortable and constant.

For stops from greater velocities, a deceleration characteristic in the form of an inverted bell curve, as shown FIG. 4c, is less suitable since human drivers brake differently in such cases. An experienced human driver who likes to brake gently does this not only so that the jerk, change in acceleration over time, remains as small as possible, but also to hold the deceleration within comfortable limits, to the greatest extent possible. On the basis of the bell curve characteristic shown in FIG. 4c, the maximum deceleration would assume very high values in the case of stops from higher velocities.

It is therefore proposed for stops from higher velocities to either apply the above-described part two of the method with piecewise linear deceleration. According to the invention, the method is carried out in an electrically or hybrid-electrically driven motor vehicle in order to bring the motor vehicle to a standstill at a predetermined destination point without participation by the driver, wherein the deceleration exerted on the motor vehicle is ascertained, entirely or in part, as the difference of a spring force-like component and a damping component which is proportional to the present vehicle velocity.

The spring force-like component can be constant for longer distances to the destination point and, from a determined distance onward, can decrease in a linear, hyperbolic tangent or exponential manner for the remaining distance to the destination.

For stops from higher speeds, the deceleration, as shown in FIG. 5, can decrease in a linear manner, with a first slope value, for the remaining distance to the destination and, from a certain distance onward, can decrease in a linear manner, with a second slope value, for the remaining distance to the destination, wherein the second slope value has a greater absolute value than the first slope value.

In preferred embodiments, the method is carried out for stops having lower initial velocities in the magnitude of 10 km/h or less by determining the deceleration exerted on the motor vehicle by means of the following formula:

$$trq = trq\_gain \cdot (1 - \exp(-\max((dtt - offset) \cdot scale\_down, 0))) - v \cdot damping\_coeff$$

in which
trq=net torque
trq_gain=maximum torque
dtt=distance to the destination
scale down=constant scale setting/trq_gain
v=instantaneous velocity
damping_coeff=damping coefficient
offset=constant In preferred embodiments, the method is carried out for stops having higher initial speeds (in the magnitude of 10 km/h or more) by determining the deceleration exerted on the motor vehicle by means of the following formula:

$$trq = decel\_profile \cdot decel\_to\_trq\_scaling + vel\_gain \cdot (refVel(x) - v)$$

in which
decel_profile=piecewise linear deceleration profile
decel_to_trq_scaling=scaling for deceleration/torque
vel_gain=velocity gain factor
refVel(x)−v=piecewise linear deceleration profile integrated with respect to time.

As set forth above, the method and system makes it possible to bring an electrically or hybrid-electrically driven motor vehicle to a standstill at a destination point at least as gently and jerk-free as possible for an experienced human driver and with a maximum deviation of approximately 10 cm to 15 cm.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for jerk-free stopping of a motor vehicle to automatically bring the motor vehicle to a standstill at a predetermined destination point comprising:
   a power source;
   a friction brake system, said power source and said friction brake system exerting a deceleration force to decelerate the vehicle, said deceleration force based on a difference between a spring force component and a damping component, wherein said damping component is proportional to vehicle velocity.

2. The system of claim 1 wherein said spring force component remains constant up to a predetermined distance to the destination point; and,
   decreases in a linear, tan hyperbolic or exponential manner from said predetermined distance to the destination point for the remaining distance to the destination point.

3. The system of claim 1 wherein said deceleration decreases linearly, with a first slope value, up to a predetermined distance to the destination point; and
   decreases in a linear manner, with a second slope value, from said predetermined distance to the destination point for the remaining distance to the destination point, wherein said second slope value has a greater absolute value than said first slope value.

* * * * *